United States Patent [19]

Yamada

[11] 4,373,786
[45] Feb. 15, 1983

[54] PHOTOGRAPHIC OBJECTIVE OF REDUCED SIZE

[75] Inventor: Yasuyuki Yamada, Mitaka, Japan

[73] Assignee: Canon Kabushiki Kaisha, Tokyo, Japan

[21] Appl. No.: 291,630

[22] Filed: Aug. 10, 1981

[30] Foreign Application Priority Data

Aug. 19, 1980 [JP] Japan .................................. 55-114199

[51] Int. Cl.³ ........................... G02B 3/04; G02B 9/34
[52] U.S. Cl. ..................................... 350/432; 350/469
[58] Field of Search ............................... 350/432, 469

[56] References Cited

U.S. PATENT DOCUMENTS

| | | | |
|---|---|---|---|
| 2,446,402 | 8/1948 | Aklin | 350/469 |
| 3,951,523 | 4/1976 | Nishimoto | 350/432 |
| 3,998,527 | 12/1976 | Ikada et al. | 350/432 |
| 4,124,276 | 11/1978 | Okano et al. | 350/469 X |

FOREIGN PATENT DOCUMENTS 55-73014  6/1980  Japan .................................. 350/469

*Primary Examiner*—John K. Corbin
*Assistant Examiner*—Scott J. Sugarman
*Attorney, Agent, or Firm*—Toren, McGeady and Stanger

[57] ABSTRACT

The disclosed photographic objective includes, from front to rear, a meniscus first lens of positive power convex toward the front, a bi-concave second lens, a bi-convex third lens, and a negative-power fourth lens whose front surface is concave toward the front and aspherical. The form of each of the lenses, the glass material, and the air separations between the successive lenses being chosen to reduce the overall size of the objective while still permitting good correction of aberrations.

1 Claim, 4 Drawing Figures

PHOTOGRAPHIC OBJECTIVE OF REDUCED SIZE

BACKGROUND OF THE INVENTION

1. Field of the Invention

This invention relates to lens systems of short total length measured from the front vertex to the focal plane, and more particularly to a small photographic objective with an angular field of about 63° and an F-number of about 3.5.

2. Description of the Prior Art

Recently, as cameras have been reduced in size, the demand has arisen for compact lenses of short focal length. Where the total length of a lens system is reduced to less than the focal length, it is desirable to distribute positive refractive power over the front group of lenses in the lens system and a negative refractive power over the rear group of lenses, or to employ a so-called telephoto-type system. Such power distribution has found many uses in long focal length lenses of narrow angular fields, but there are only a few examples of its application to wide angle objectives having angular fields of at least 60° in a short lens system with a large relative aperture.

With this type of power distribution, when the total length is reduced, and when the relative aperture is increased also, while the angular field is also widened, the distortion and astigmatism deteriorate badly or extremely large increases of coma and halo result.

U.S. Pat. No. 3,998,527 and Japanese Pat. Sho 44-10831 illustrate attempts to provide for photographic objectives of the telephoto type with increased angular fields. In the Japanese patent, the angular field is attained at a relatively narrow value, namely 46°, while the U.S. Patent illustrates a relatively wide angular field, namely 63°, but results in an F-number of 4.5.

SUMMARY OF THE INVENTION

The present applicant has proposed in Japanese Patent Application Sho 54-172405, a fast wide angle objective comprising, from front to rear, a meniscus lens of positive power, a lens of negative power, a lens of positive power and a meniscus lens of negative power with its front surface concave toward the front, said concave surface being strongly curved. Where this form of objective is employed for incorporation in a thin small-sized camera body, in order to give full play to the advantages of permitting the diaphragm mechanism to be positioned in the camera body in fixedly secured relation and the capability of lightening the weight of the movable lenses, it is desirable that the first three lenses constituting a front group be made to move for focusing purposes.

It is an object of the present invention to further improve the above-described proposal and to provide an objective lens of such construction that even when decentering of the lens groups occurs during focusing by the front group, the range of variation of the aberrations is limited to a minimum. To achieve this, the refractive power of the last lens is weakened to moderate the influence of the decentering. Though this provision leads to change the power distribution over the entire system, to cope with this change, the lens elements are formed that the various aberrations are well corrected.

DESCRIPTION OF PREFERRED EMBODIMENTS

Figure 1:
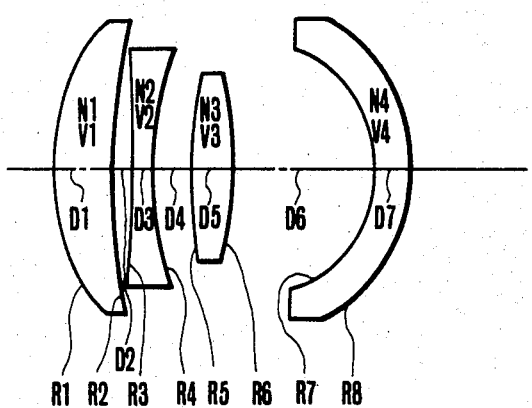
FIG. 1 is a longitudinal sectional view of an embodiment of an objective according to the present invention.
Figures 2A, 2B, 2C:
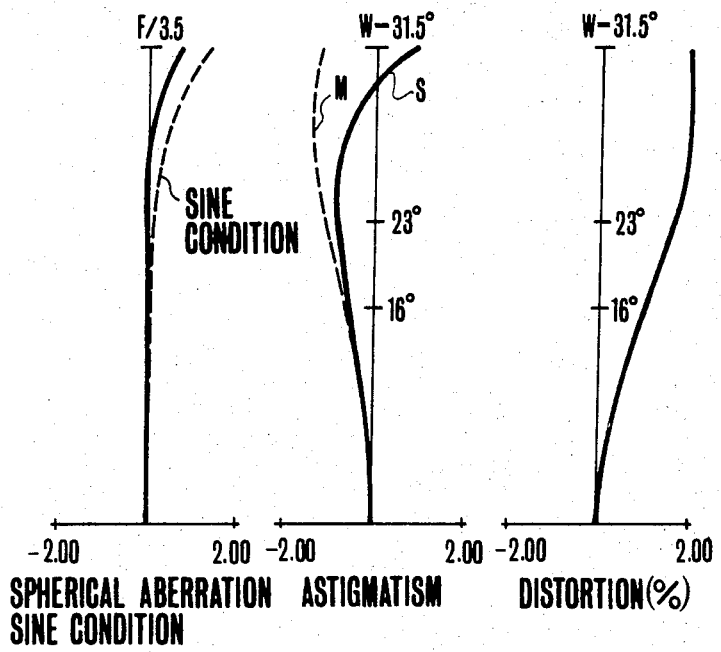
FIGS. 2a, 2b and 2c are graphic representations of the aberrations of the objective of FIG. 1.

In an embodiment of the present invention, the photographic objective has, as shown in FIG. 1, from front to rear, a meniscus first lens of positive power convex toward the front, a second lens of bi-concave form, a third lens of bi-convex form and a meniscus fourth lens of negative power concave toward the front in strong curvature, the front lens surface of the fourth lens being aspherical. The equation for the aspherical surface is expressed by:

$$\Delta X = \frac{(1/R^*)Y^2}{1 + \sqrt{1 - (1/R^*)}} + A_1 Y^2 + A_2 Y^4 + A_3 Y^6 \ldots +$$

$$B_1 Y^3 + B_2 Y^5 + \ldots - \frac{(1/R)Y^2}{1 + \sqrt{1 - (Y/R)^2}}$$

where $\Delta X$, assuming that the optical axis is taken as X-axis, the direction perpendicular to the optical axis as Y-axis, the direction in which light advances as positive and the cross-point between the vertex of the objective and the optical axis at the original point, it is the difference along the X-axis between the aspherical surface and the extrapolation of a spherical surface contributing to the determination of the focal length;

R: the radius of curvature of the paraxial region;

R*: the radius of curvature of the lens standard spherical surface defined in $R^* = R/(1 - 2RA_1)$ $A_i$ = the spheric even coefficients $B_i$ = the aspheric odd coefficients.

An example of a specific objective of the invention can be constructed in accordance with the following numerical data as related to a focal length F of 100 millimeters.

| F = 100 | F-number = 1:3.5 | Image Angle 2ω = 63° | |
|---|---|---|---|
| Radius of Curvature | Thickness & Separation | Refractive Index (Nd) | Abbe Number (νd) |
| R1 = 28.32 | D1 = 8.59 | N1 = 1.77250 | ν1 = 49.6 |
| R2 = 86.00 | D2 = 2.66 | | |
| R3 = −159.52 | D3 = 2.86 | N2 = 1.80518 | ν2 = 25.4 |
| R4 = 43.65 | D4 = 5.33 | | |
| R5 = 69.12 | D5 = 5.44 | N3 = 1.60342 | ν3 = 38.0 |
| R6 = −69.12 | D6 = 20.51 | | |
| R*7 = −16.56 | D7 = 4.58 | N4 = 1.49171 | ν4 = 57.4 |
| R8 = −22.20 | | | |

| Aspherical Coefficients | |
|---|---|
| A1 = −0.17023 × 10⁻² | B1 = −0.54318 × 10⁻⁴ |
| A2 = 0.65538 × 10⁻⁵ | B2 = 0.73458 × 10⁻⁷ |
| A3 = −0.74579 × 10⁻⁷ | B3 = 0.15509 × 10⁻⁸ |
| A4 = 0.28740 × 10⁻⁹ | B4 = −0.13024 × 10⁻¹⁰ |
| A5 = 0.11786 × 10⁻¹² | |

By giving various dimensions to the above-listed values it is made possible to achieve a remarkable reduction in the size of the photographic objective while still permitting good correction of aberrations since the various aberrations vary to an extremely small extent even when the lens groups are decentered from each other during focusing by moving the front lens group.

What is claimed is:

1. A photographic objective of reduced size including the following various conditions:

from front to rear;

a first lens in the form of a positive meniscus lens convex toward the front;

a second lens in the form of a negative lens;

a third lens in the form of a positive lens;

a fourth lens with the front surface concave toward the front, said concave surface being aspheric and said aspheric surface being figured by the following equation:

$$\Delta X = \frac{(1/R^*)Y^2}{1 + \sqrt{1 - (Y/R^*)^2}} + A_1Y^2 + A_2Y^4 + A_3Y^6 + \ldots + B_1Y^3 + B_2Y^5 + \ldots - \frac{(1/R)Y^2}{1 + \sqrt{1 - (Y/R)^2}}$$

where the axial direction is taken as the X-axis, the direction perpendicular to the optical axis as the Y-axis, the direction in which light advances as positive, and the intersection of the vertex and the X-axis at the original point, and the difference along the X-axis direction between the aspheric surface and the surface obtained by extrapolating the spherical surface contributing to the determination of the focal length is denoted by $\Delta X$, the radius of curvature of the paraxial region by R, the radius of curvature of the standard spherical surface of the lens defined as $R^* = R/(1 - 2RA_1)$, the aspheric even coefficients by $A_i$ and the aspheric odd coefficients by $B_i$;

and being characterized by the following numerical values for the radii of curvature of the lens surface $R_i$ numbered the i-th from the front, the lens thicknesses and axial air separations $D_i$, the refractive indices for spectral d lines of the glasses of the lens elements $N_i$, and Abbe numbers $\nu_i$ of the glasses of the lens elements as related to a focal length of the entire lens system $f = 100$:

| F = 100 | F-number = 1:3.5 | Image Angle 2ω = 63° | |
|---|---|---|---|
| Radius of Curvature | Thickness & Separation | Refractive Index (Nd) | Abbe Number (νd) |
| R1 = 28.32 | D1 = 8.59 | N1 = 1.77250 | ν1 = 49.6 |
| R2 = 86.00 | D2 = 2.66 | | |
| R3 = −159.52 | D3 = 2.86 | N2 = 1.80518 | ν2 = 25.4 |
| R4 = 43.65 | D4 = 5.33 | | |
| R5 = 69.12 | D5 = 5.44 | N3 = 1.60342 | ν3 = 38.0 |
| R6 = −69.12 | D6 = 20.51 | | |
| R7 = −16.56 | D7 = 4.58 | N4 = 1.49171 | ν4 = 57.4 |
| R8 = −22.20 | | | |

| Aspherical Coefficients (the Aspheric surface at R7) | |
|---|---|
| A1 = −0.17023 × $10^{-2}$ | B1 = −0.54318 × $10^{-4}$ |
| A2 = 0.65538 × $10^{-5}$ | B2 = 0.73458 × $10^{-7}$ |
| A3 = −0.74579 × $10^{-7}$ | B3 = 0.15509 × $10^{-8}$ |
| A4 = 0.28740 × $10^{-9}$ | B4 = −0.13024 × $10^{-10}$ |
| A5 = 0.11786 × $10^{-12}$ | |

* * * * *